US010212029B2

(12) United States Patent
Shaker et al.

(10) Patent No.: US 10,212,029 B2
(45) Date of Patent: Feb. 19, 2019

(54) SERVICE PROVISIONING IN CLOUD COMPUTING SYSTEMS

(71) Applicant: Microsoft Technology Licensing, LLC, Redmond, WA (US)

(72) Inventors: Alaa Shaker, Kirkland, WA (US); Brad Olenick, Kirkland, WA (US); Steve Sanderson, Bristol (GB); Nick Harris, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 15/182,793

(22) Filed: Jun. 15, 2016

(65) Prior Publication Data

US 2017/0366393 A1 Dec. 21, 2017

(51) Int. Cl.
| | |
|---|---|
| *G06F 15/177* | (2006.01) |
| *H04L 12/24* | (2006.01) |
| *G06F 9/54* | (2006.01) |
| *H04L 29/08* | (2006.01) |
| *G06F 9/50* | (2006.01) |

(52) U.S. Cl.
CPC ........ *H04L 41/0803* (2013.01); *G06F 9/5072* (2013.01); *G06F 9/542* (2013.01); *H04L 67/02* (2013.01)

(58) Field of Classification Search
USPC ................................ 709/220, 201, 222, 229
See application file for complete search history.

(56) References Cited

PUBLICATIONS

"International Search Report and Written Opinion Issued in PCT Application No. PCT/US2017/036469", dated Sep. 15, 2017, 9 Pages.

*Primary Examiner* — Lan Dai T Truong
(74) *Attorney, Agent, or Firm* — Liang IP, PLLC

(57) ABSTRACT

Techniques for provisioning cloud services in cloud computing systems are disclosed herein. In one embodiment, a method can include providing a user portal configured to communicate with a deployment application configured by a user for provisioning cloud services in the cloud computing system. The method can also include receiving a notification from the user-configured deployment application that a provisioning process is initiated for a cloud service in the cloud computing system. In response to receiving the notification, the method can include assigning a distinct provisioning identifier to the initiated provisioning process associated with the notification and causing an output field associated with the distinct provisioning identifier to be displayed on the user portal. Subsequently, messages of status updates can be forwarded to the status display according to the assigned distinct provisioning identifier.

20 Claims, 10 Drawing Sheets

SERVICE PROVISIONING IN CLOUD COMPUTING SYSTEMS

BACKGROUND

Remote or "cloud" computing typically utilizes a collection of remote servers in datacenters to provide computing, cloud storage, communications, or other cloud services. A communications network can interconnect the remote servers as nodes to form one or more computing fabrics in datacenters. During operation, one or more nodes in the datacenters can cooperate to provide a distributed computing environment that facilitates execution of various user applications in order to provide associated cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In cloud computing systems, service provisioning normally precedes execution of applications to provide requested cloud services. For example, service provisioning can include selecting one or more servers from a pool of available servers in datacenters, computing clusters, or other computing facilities. Images or copies of operating systems, device drivers, middleware, applications, or other suitable software components can then be located and provided to the selected servers. The software components can then be configured to generate a boot image for the selected servers. Also, IP addresses, IP Gateways, virtual networks, domain name servers, or other network parameters to suitable computer networks and storage resources can also be specified. The servers can then start one or more virtual machines to load and execute the software components to provide the requested cloud services.

Certain cloud computing systems can provide a user portal (e.g., a website) to allow a user to deploy a cloud service in a cloud computing system. For example, the user portal can include a graphical user interface ("GUI") with input fields that allow the user to specify a name, application model, subscription identification, resource group, service location, or other suitable information related to the cloud service. The user portal can also allow the user to upload domain logic to the cloud computing system. The domain logic can encode rules or procedures for determining how data related to the cloud service can be created, displayed, stored, and/or modified. Upon receiving such information, the user portal (or other suitable components in the cloud computing system) can request, negotiate, or otherwise interact with a fabric controller, datacenter controller, or other suitable components of a management layer in the cloud computing system to provision for the cloud service.

The foregoing provisioning process, however, can place a heavy burden on the user portal and the cloud computing system. For instance, to appropriately provision for a cloud service, the cloud computing system needs certain levels of knowledge and understanding of the domain logic related to the cloud service. Acquiring such knowledge and understanding, however, can be time consuming and costly. As such, provisioning for the cloud service can be slow and can consume a large amount of resources at the cloud computing system. Thus, the foregoing provisioning process can result in a long delay in deploying cloud services (commonly referred to as "onboarding") while allowing limited or no user customization of the provisioning process.

Several embodiments of the disclosed technology can relieve the heavy burden placed on the user portal and the cloud computing system by implementing a user customizable and configurable provisioning process. In one implementation, the user portal can be configured to allow execution of a user-configured deployment application, for example, as one or more extensions to the user portal. In one example, the deployment application can include an input display and a provisioning component. The input display can include one or more input fields displayable on the user portal and configured to receive specification data related to the cloud service. The provisioning component can be user-configured to initiate, manage, or otherwise perform a provisioning process for the cloud service in the background, in the foreground, or in other suitable manners. Upon actuation, the provisioning component can transmit a request for provisioning the cloud service to the management layer of the cloud computing system to initiate the provisioning process and an initiation notification to the user portal once the provisioning process is initiated.

The user portal can also be configured to register a particular provisioning process with a distinct identifier in response to receiving the initiation notification from the provisioning component. and the user portal can then selectively forward status updates to a status display, for example, included in another extension of the user portal, according to the provisioning identifier. In one example, the status display can replace the input display on the user portal once the particular provisioning process is initiated. The status display can include one or more output fields that show a status, progress percentage, or other suitable notifications related to the provisioning process. During provisioning, the user portal can receive and relay any received status updates from the provisioning component to the status display based on provisioning identifiers associated with the status updates. In other examples, the status display can be eliminated, and instead the output fields can be placed in other suitable locations in the user portal. In further embodiments, the input display and/or status display may be configured in other suitable ways.

Several embodiments of the disclosed technology can substantially reduce provisioning workload on the user portal by offloading management of the provisioning process to the user-configured deployment application. As such, the cloud computing system has limited or no need for understanding the domain logic related to the cloud service. Instead, the user portal acts as a shell that can receive a request for initiation of a provisioning process, replay status updates of the provisioning process to the status display on the user portal, and receive notification that the provisioning process is completed/failed. As a result, several embodiments of the disclosed technology can increase the availability of the user portal to handle additional user requests for cloud services. Several embodiments of the disclosed technology can also allow increased user customization of deployment processes related to cloud services in comparison to other computing systems.

DETAILED DESCRIPTION

Figure 1A:
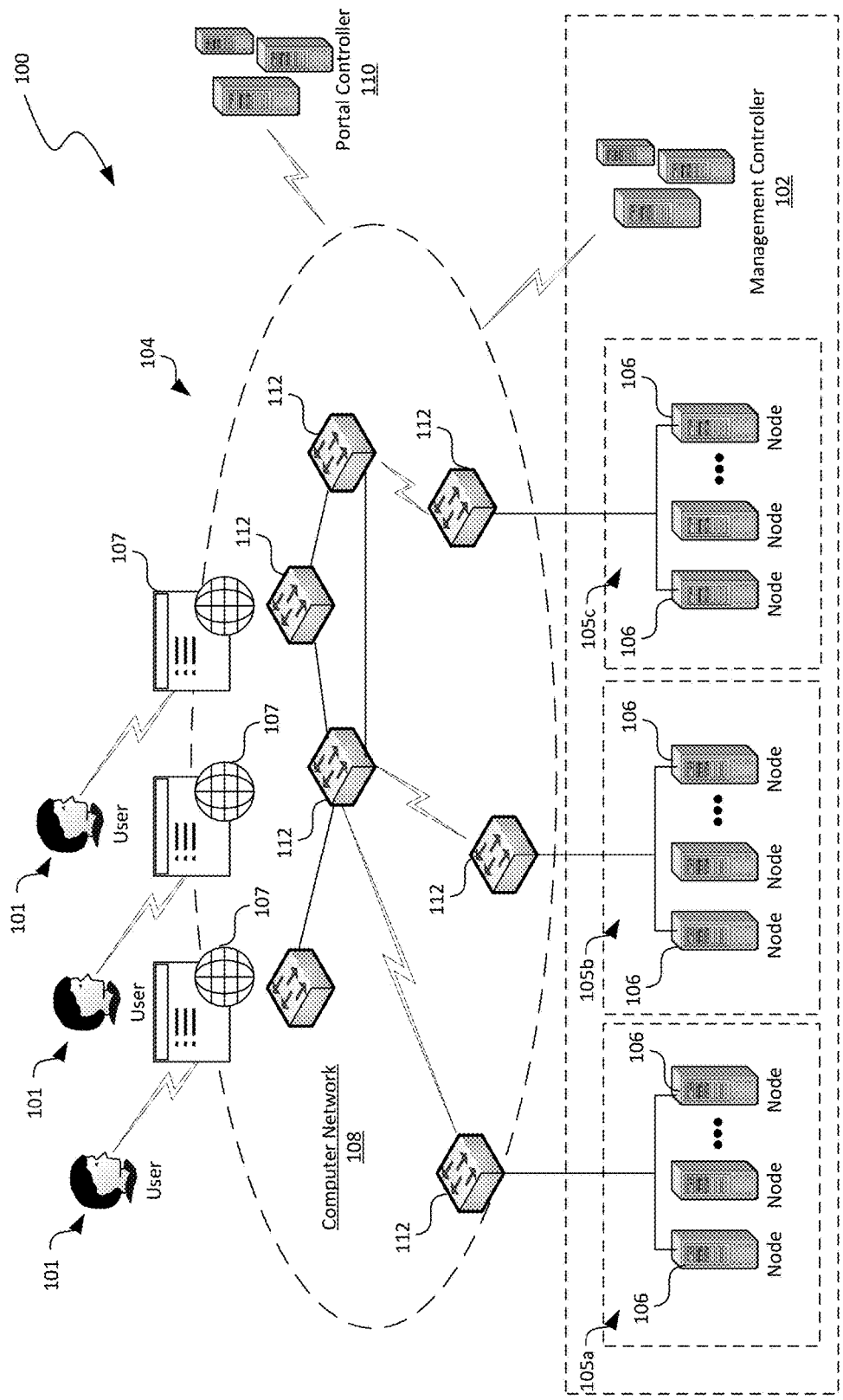
FIG. 1A is a schematic diagram of a cloud computing system in accordance with embodiments of the disclosed technology.

Certain embodiments of computing systems, devices, components, modules, routines, and processes for managing provisioning processes for cloud services in cloud computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1A-5.

As used herein, the term "computing cluster" generally refers to a computer system having a plurality of network devices that interconnect a plurality of servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

Also used herein, the term "cloud service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, the term "provisioning" or "service provisioning" generally refers to a set of preparatory actions for execution of applications in a cloud computing system to provide desired cloud services. For example, provisioning can include selecting one or more servers from a pool of available servers in datacenters, computing clusters, or other computing facilities. Provisioning can also include locating and providing access to images of operating systems, device drivers, middleware, applications, or other suitable software components related to the cloud services. The images of the software components can then be configured to generate a boot image for the selected servers. Provisioning can also include assigning IP addresses, IP Gateways, virtual networks, domain name servers, or other network parameters to the selected servers and/or executed software components. The servers can then start one or more virtual machines to load and execute the software components to in order to provide the cloud services.

Further used herein, the term "extension" generally refers to a computer program having codes that extend the functionality of a website (e.g., a user portal) in some ways. Extensions can be authored using HTML, JavaScript, CSS, or other web technologies. For example, extensions can extend functionality of the Azure portal at "portal.azure.com" itself. At a basic level, an extension in a user portal provides a user a way to create, inspect, monitor, delete, and configure some type of cloud assets or resources. The assets can include basic components, such as a virtual machine or public IP addresses, or a collection of assets working together.

Such extensions can also be placed in "sandboxes" of a user portal so the extensions do not directly interact with one another. User portal administrators can provide JavaScript or other suitable types of API to allow users the ability to implement any desired domain logic. The users can also provide a declarative user interface definition that describes how to integrate a user interface of an extension into that of the website. Such integration can allow the website to initialize one or more extension(s) as late as when the interface of the user is to be presented.

Also used herein, the term "user portal" or "client portal" generally refers to a website provided by a cloud service provider to a user for viewing and/or managing various aspects of the cloud services associated with the user. For example, the user portal can display information such as subscriptions, current cloud service status, scheduled maintenance, service usage data, etc. The user portal can also include utility applications or tools that allow the user to submit new subscriptions, modify existing subscriptions, cancel subscriptions, deploy new cloud services, or perform other suitable actions. One example user portal is the AWS Management Portal provided by Amazon.com of Seattle, Washington.

In certain cloud computing systems, provisioning for cloud services can place a heavy burden on a user portal and can be a very slow process. To appropriately provision for a cloud service, the cloud computing system needs certain levels of knowledge and understanding of the domain logic related to the cloud service. Acquiring such knowledge and understanding, however, can be time consuming and costly. Thus, such provisioning can result in long delays in deploying cloud services and does not allow user customization of the deployment process.

Several embodiments of the disclosed technology can relieve such heavy burden on the user portal by implementing a user configurable provisioning process. For example, the user portal can act as a shell that receives a request for initiation of a provisioning process, replays status updates of the provisioning process to be displayed, and receive notification that the provisioning process is completed/failed. As a result, several embodiments of the disclosed technology can increase the availability of the user portal to handle additional user requests for cloud services, and allow increased user customization of deployment processes, as described in more detail below with reference to FIGS. 1A-5.

FIG. 1A is a schematic diagram illustrating a cloud computing system 100 having service provisioning implemented in accordance with embodiments of the disclosed technology. As shown in FIG. 1A, the computing system 100 can include an underlay network 108 interconnecting a plurality of users 101, a computing fabric 104, and a portal controller 110. Even though particular components of the computing system 100 are shown in FIG. 1A, in other embodiments, the computing system 100 can also include additional and/or different constituents. For example, the computing system 100 can also include additional computing fabrics (not shown) interconnected with one another, network storage devices, utility infrastructures, and/or other suitable components.

As shown in FIG. 1A, the underlay network 108 can include one or more physical network devices 112 that interconnect the users 101, the computing fabric 104, and the portal controller 110. Examples of the network devices 112 can include routers, switches, firewalls, load balancers, or other suitable network components. Even though particular connection scheme is shown in FIG. 1A for illustration purposes, in other embodiments, the network devices 112 can be operatively coupled in a hierarchical, flat, "mesh," or other suitable topologies.

The computing fabric 104 can also include a management controller 102 and a plurality of nodes 106 operatively coupled to one another by the network devices 112. In certain embodiments, the nodes 106 can individually include a processor, a physical server, or several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three arranged into three computing clusters 105 (shown individually as first, second, and third computing clusters 105a-105c, respectively), which are operatively coupled to corresponding network devices 112 in the underlay network 108. Even though three computing clusters 105 are shown in FIG. 1A for illustration purposes, in other embodiments, the computing fabric 104 can include one, two, eight, sixteen, or any other suitable numbers of computing clusters 105 with similar or different components and/or configurations.

The management controller 102 can be configured to monitor, control, or otherwise manage operations of the nodes 106 in the computing clusters 105. For example, in certain embodiments, the management controller 102 can include a fabric controller configured to manage processing, storage, communications, or other suitable types of hardware resources in the computing clusters 105 for hosting cloud services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more nodes 106 in the computing clusters 105. In further embodiments, the management controller 102 can include software services hosted on one or more of the nodes 106 in the computing clusters 105.

The portal controller 110 can be configured to provide user portals 107 to allow the users 101 to access and manage various cloud services provided by the computing system 100. The portal controller 110 can also be configured to allow execution of user-configured deployment applications and relay messages among the deployment applications to be displayed on user portals 107. In certain embodiments, the user-configured deployment applications can be executed in the user portals 107 as extensions. In other embodiments, the user-configured deployment applications can be executed in other suitable containers in the user portals 107 or as a standalone application in, for example, one or more virtual machines 144 (shown in FIG. 1B) associated with the users 101. Certain example components of the portal controller 110 are described in more detail below with reference to FIGS. 2A-3D.

In operation, the users 101 can request deployment of a cloud service via the user portals 107. Unlike in other computing systems, several embodiments of the computing system 100 can enable the users 101 to customize and configure one or more deployment applications that manage a provisioning process to deploy the cloud services. For example, the users 101 (or other suitable entities) can develop codes and input/output interfaces of the deployment applications to incorporate domain logic specific to the users 101. In certain embodiments, the users 101 can then submit the deployment applications to the portal controller 110 as one or more extensions to the user portals 107. In other embodiments, the users 101 can also submit the deployment applications as a standalone applications, script, plug-ins, or components in other suitable forms.

To initiate a provisioning process, the users 101 can actuate a submitted deployment application via the user portals 107 or via other suitable channels. In response, the portal controller 110 can allow input/output interfaces (e.g., input display 162 in FIG. 2A) of the deployment application be shown in the user portals 107. The deployment application can collect user inputs of specification data regarding the cloud service to be deployed via the input/output interfaces in the user portals 107. The deployment application can then transmit a request for initiating and performing a provisioning process to the management controller 102.

Once forwarded to the management controller 102, the deployment application can then interact, negotiate, or otherwise cooperate with the management controller 102 to implement the provisioning process. When the provisioning process is initiated, in certain embodiments, the input display 162 can be dismissed from the user portal 107, and the deployment application can transmit an initiation notification to the portal controller 110. In response, the portal controller 110 can register the initiated provisioning process and assign a distinct provisioning identifier (e.g., a text string, alphanumeric string, integer number, etc.) to the initiated provisioning process.

During provisioning, the deployment application can receive messages of status updates regarding the provisioning process from the management controller 102. The deployment application can then forward the received messages to the portal controller 110 with corresponding distinct provisioning identifiers. The portal controller 110 can then selectively cause the status updates contained in the messages be forwarded to one or more status applications (e.g., the status application 161 in FIG. 2B). The status displays can then display the status updates on the user portals 107 according to the distinct provisioning identifiers associated with the messages. Once the provisioning process is completed, the deployment application can transmit a completion notification to the portal controller 110. In response, the portal controller 110 can cause the one or more status applications on the user portal 107 be updated accordingly.

By allowing execution of the user-configured deployment application, several embodiments of the computing system 100 can significantly reduce operational burdens of provisioning on the portal controller 110. Unlike in other computing systems, the portal controller 110 does not need to have knowledge of or understand domain logic associated with the deployment application. Instead, the user portals 107 can act as a shell that forwards requests for initiation of provisioning processes, replays messages of status updates of the provisioning processes according to the distinct provisioning identifiers, and receives notifications that the provisioning process is completed/failed. As a result, several embodiments of the disclosed technology can increase the availability of the user portals 107 to handle additional user requests for deploying cloud services as well as allowing increased user customization of the deployment processes of cloud services in the computing system 100.

Figure 1B:
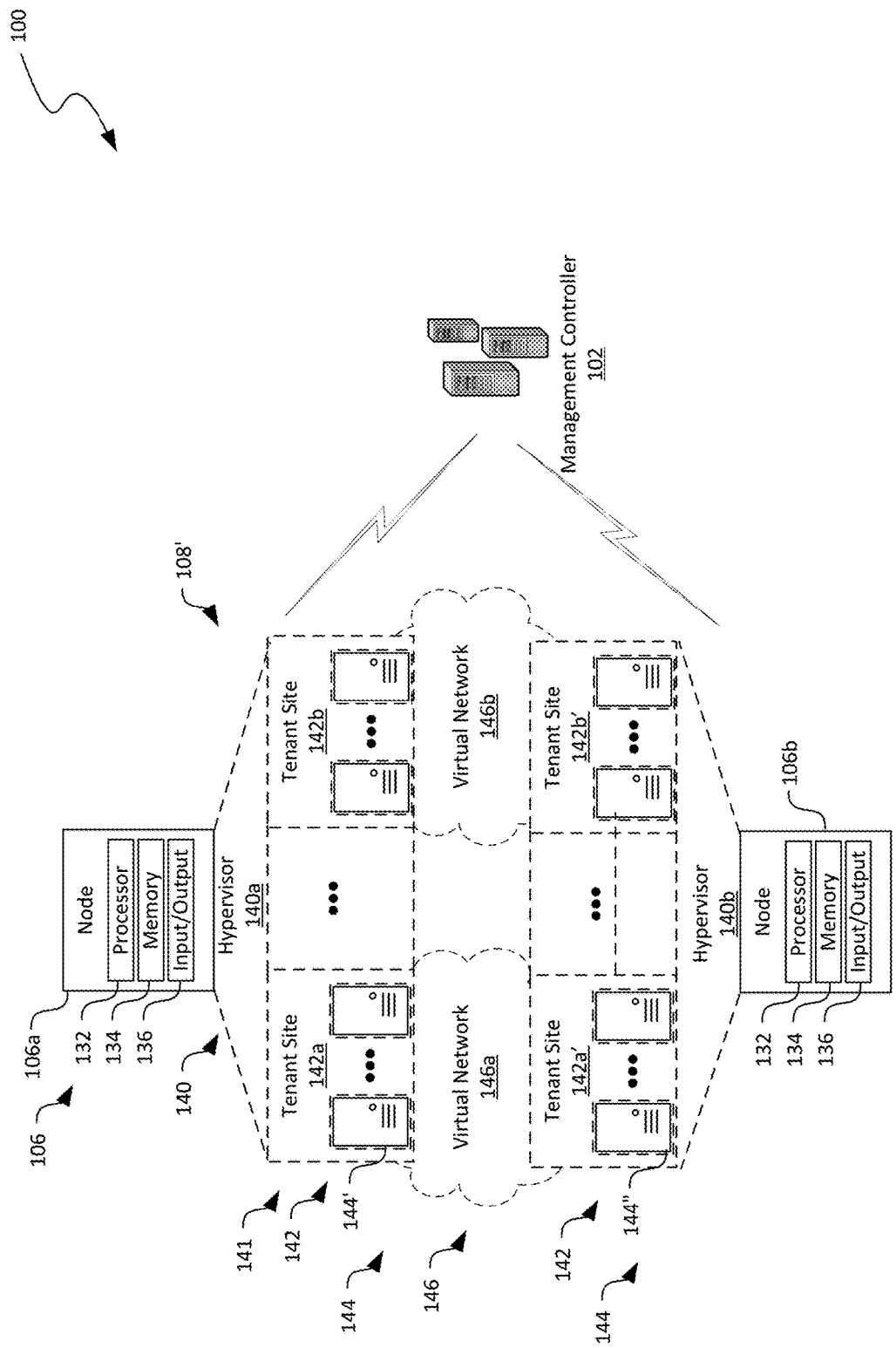
FIG. 1B is a schematic diagram illustrating certain hardware/software components of the computing system of FIG. 1A in accordance with embodiments of the disclosed technology.

FIG. 1B is a schematic diagram illustrating an example overlay network 108' implemented on the underlay network 108 of FIG. 1 in accordance with embodiments of the disclosed technology. In FIG. 1B, only certain components of the underlay network 108 of FIG. 1A are shown for clarity. As shown in FIG. 1B, the first node 106a and the second node 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 5). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second nodes 106a and 106b can include instructions executable by the processors 132 to cause the individual processors 132 to provide a hypervisor 140 (identified individually as first and second hypervisors 140a and 140b) and other suitable components (not shown). The hypervisors 140 can individually be configured to initiate, monitor, terminate, and/or otherwise locally manage one or more virtual machines 144 organized into tenant sites 142. For example, as shown in FIG. 1B, the first node 106a can provide a first hypervisor 140a that manages first and second tenant sites 142a and 142b, respectively. The second node 106b can provide a second hypervisor 140b that manages first and second tenant sites 142a' and 142b', respectively. The hypervisors 140 can be software, firmware, or hardware components. The tenant sites 142 can each include multiple virtual machines 144 or other suitable tenant instances for a particular tenant (not shown). For example, the first node 106a and the second node 106b can both host the tenant site 142a and 142a' for a first tenant 101a (FIG. 1). The first node 106a and the second node 106b can both host the tenant site 142b and 142b' for a second tenant 101b (FIG. 1). Each virtual machine 144 can be executing a corresponding operating system, middleware, and/or applications.

Also shown in FIG. 1B, the computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first node 106a and the second node 106b. A second virtual network 146b interconnects the second tenant sites 142b and 142b' at the first node 106a and the second node 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

Figure 2A:
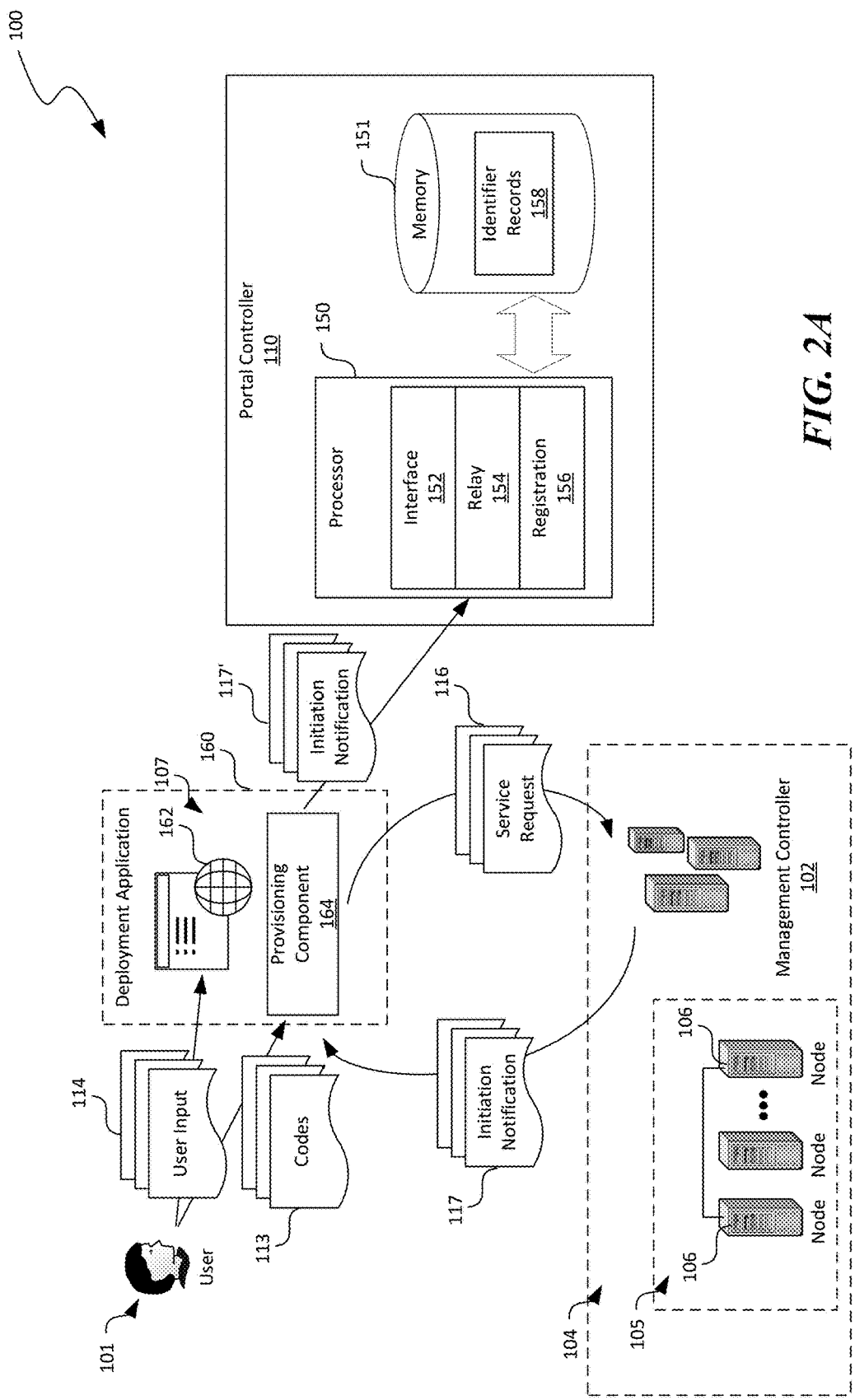
FIGS. 2A-2C are schematic diagrams illustrating certain hardware/software components of the computing system in FIG. 1A during certain stages of a provisioning process.
Figure 2B:
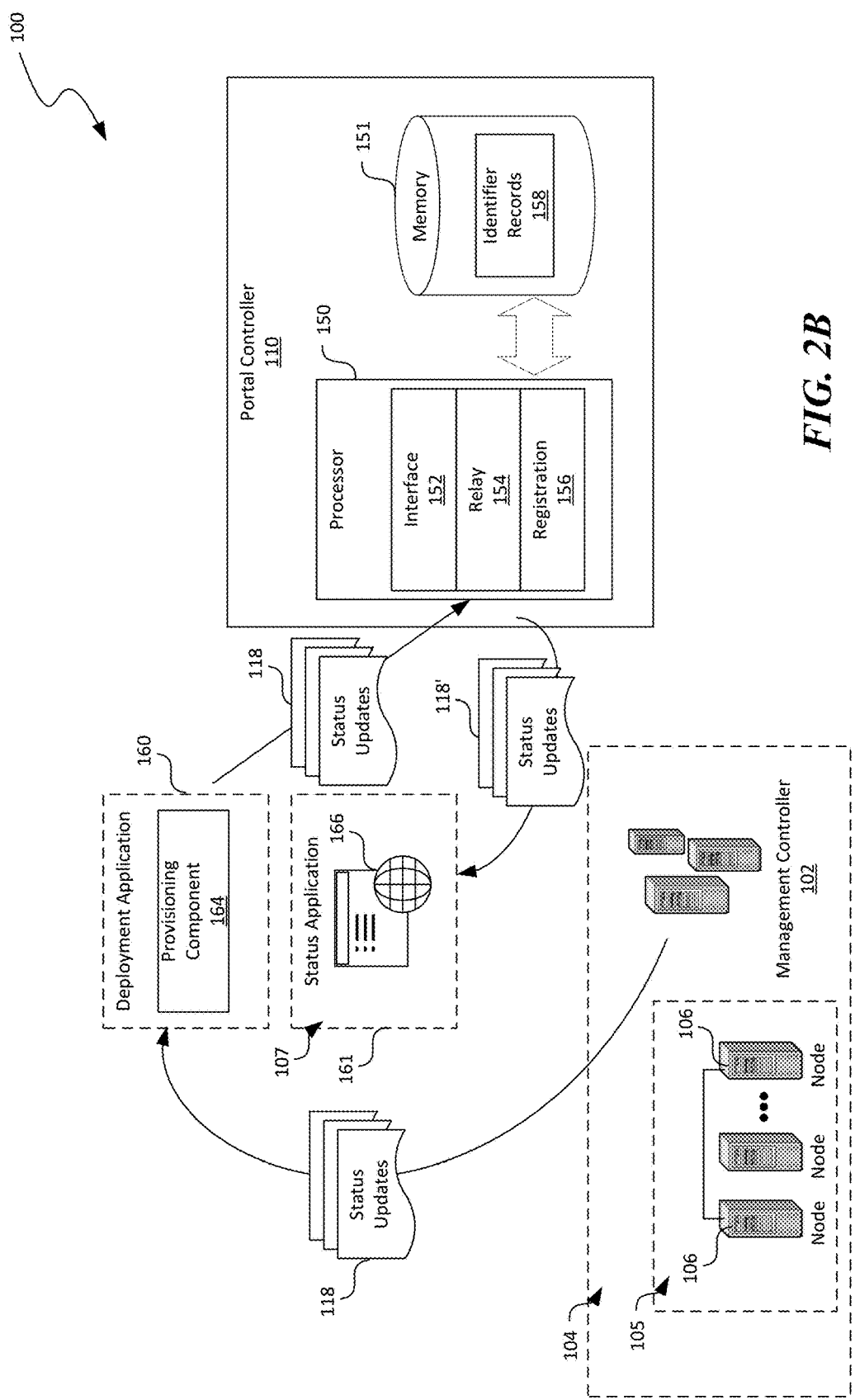
Figure 2C:
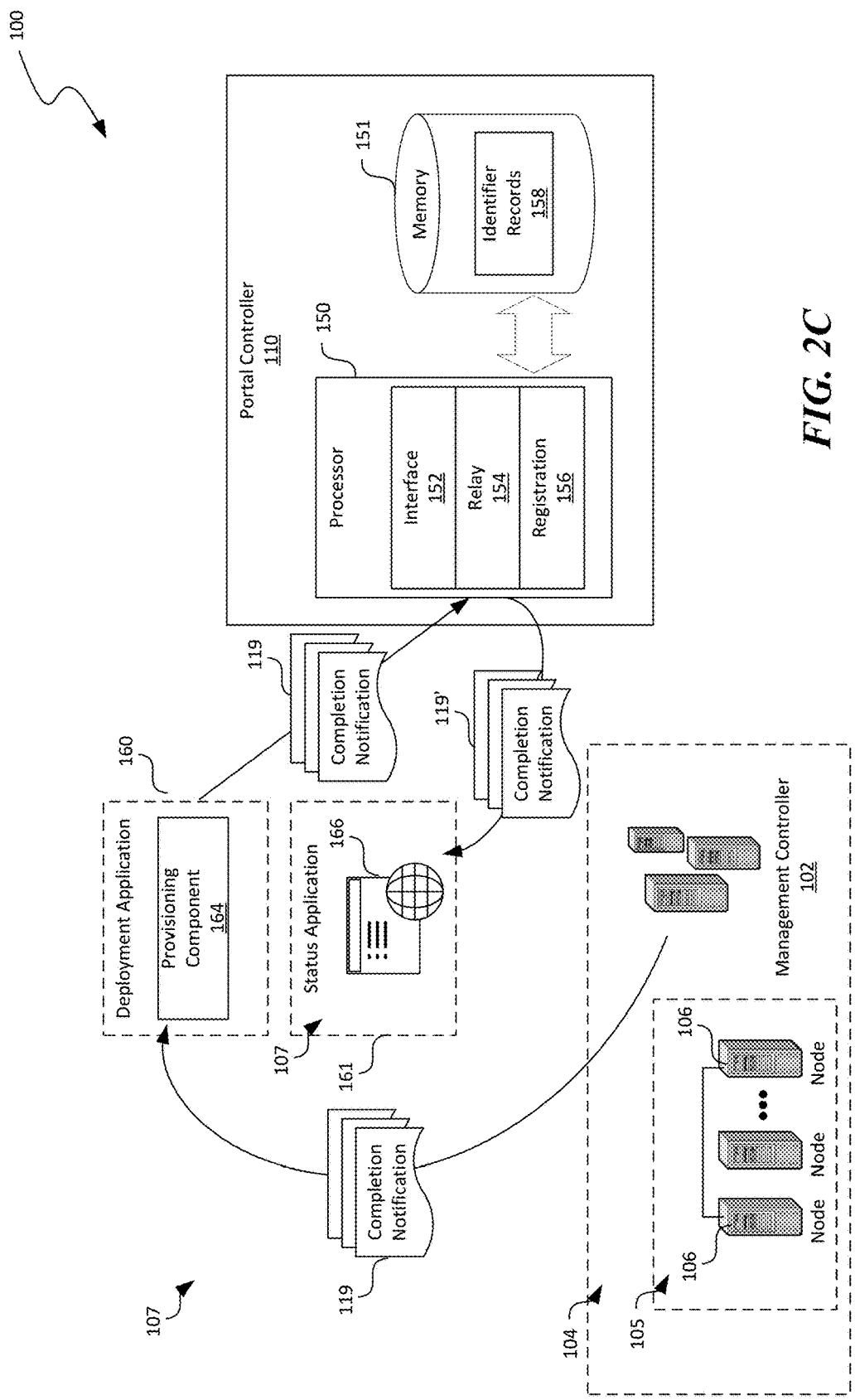

FIGS. 2A-2C are schematic diagrams illustrating certain hardware/software components of the computing system 100 in FIG. 1A during certain stages of a provisioning process. In particular, FIGS. 2A-2C illustrate the computing system 100 during initiation, implementation, and completion stages of a provisioning process, respectively. In FIGS. 2A-2C, certain components of the computing system 100 are omitted for clarity. For example, only one computing cluster 105 is shown in FIGS. 2A-2C for illustration purposes.

In addition, in FIGS. 2A-2C and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

In FIGS. 2A-2C, a deployment application 160 and a status application 161 are used to illustrate certain aspects of the disclosed technology. The deployment application 160 and the status application 161 can be distinct extensions of the user portal 107. In other embodiments, the deployment application 160 and the status application 161 may be combined into a single extension of the user portal 107. In further embodiments, the user portal 107 can also accommodate other suitable applications associated with the provisioning processes in addition to the foregoing applications. As shown in FIG. 2A, the deployment application 160 can include an input display 162 and a provisioning component 164 operatively coupled to one another. In the illustrated embodiment, the input display 162 includes one or more input fields displayable on the user portals 107 (FIG. 1A) to receive specification data of cloud services to be deployed. Example user interfaces showing the input display 162 are described in more detail below with reference to FIGS. 3A-3D.

The provisioning component 164 can be configured to manage provisioning processes of cloud services to be hosted in the computing system 100. In the illustrated embodiment, the user 101 can provide codes 113 to the deployment application 160. In other embodiments, the user 101 can also provide display configurations, credential requirements, execution configurations, or other suitable information to the deployment application 160. In further embodiments, a developer, administrator, or other suitable types of entity can provide the codes 113, configurations, and/or other suitable information to the development application 160 in lieu of or in addition to the user 101.

In one embodiment, the provisioning component 164 can include instructions encoding domain logic related to a particular cloud service. In other embodiments, the provisioning component 164 instructions encoding user-defined sequences for provisioning processes related to certain cloud services. In certain embodiments, the provisioning component 164 can be executed by one or more of the virtual machines 144 associated with the users 101. In other embodiments, the provisioning component 164 can also be executed in other suitable computing systems (not shown) external to the computing clusters 105.

Also shown in FIG. 2A, the portal controller 110 can include a processor 150 operatively coupled to a memory 151. The processor 150 can include a microprocessor, a field-programmable gate array, and/or other suitable logic devices. The memory 132 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 150 (e.g., instructions for performing the methods discussed below with reference to FIGS. 4A-4C). The memory 151 of the portal controller 110 can contain instructions (not shown) executable by the processor 150 to cause the processor 150 to provide various software components. For example, as shown in FIGS. 2A-2C, the processor 150 can provide an interface component 152, a relay component 154, and a registration component 156. In other embodiments, the processor 150 can also provide an input component, a display component, or other suitable types of component.

The interface component 152 can be configured to output the input display 162 and the status display 166 (shown in FIG. 2B) in the user portal 107. For example, the input display 162 and the status display 166 can be outputted in one or more iFrames or other suitable containers in the user portal 107. The interface component 152 can also be configured to receive requests, notifications, or other suitable types of messages from the deployment application 160 and forward the messages to the relay component 154 and the registration component 156 for further processing. In certain embodiments, the interface component 152 can include an application programming interface ("API") accessible by the deployment application 160. In other embodiments, the interface component 152 can also include a network interface driver or other suitable components configured to allow communications between the deployment application 160 and the portal controller 110.

The relay component 154 can be configured to relay various messages from the provisioning component 160 in the deployment application to other extensions (e.g., the status application 161 shown in FIG. 2B) of the user portal 107. For example, as shown in FIG. 2A, during an initiation of a provisioning process, the user 101 can cause the input display 162 be outputted on the user portal 107 in response to an actuation from the user 101. The user 101 can then provide user input 114 of specifications related to the cloud service to be deployed. For example, the user input 114 can include information regarding a name, application model, subscription identification, resource group, service location, or other suitable information related to the cloud service.

In response to an indication from the user 101 that the user input 114 is completed, the provisioning component 164 can generate a service request 116 for initiating the provisioning process and transmit the generated service request 116 to the management controller 102, for example, via an API. Upon initiation, the management controller 110 can then transmit an initiation notification 117 to the provisioning component 164, which in turn forwards the initiation notification 117 to the portal controller 110.

The registration component 156 can be configured to register an initiated provisioning process in response to the initiation notification 117 received at the interface component 152. For example, the registration component 156 can assign a distinct provisioning identifier to the initiated provisioning process. Examples of the distinct provisioning identifier can include a random or patterned text string, alphanumeric string, integer, floating point, or other suitable identifiers. As shown in FIG. 2A, the registration component 156 can also store the assigned distinct provisioning identifier as an identifier record 158 in the memory 151.

In certain embodiments, the interface component 152 can also be configured to optionally dismiss the input display 162 from the user portal 107 and output the status display 166 of the status application 161 in the user portal 107 upon receiving the initiation notification 117, as shown in FIG. 2B. The status display 166 can include one or more output fields configured to present, on the user portals 107, status updates of provisioning processes. The interface component 152 can also be configured to associated the outputted status display 166 with the assigned distinct provisioning identifier. In other embodiments, the status display 166 may be outputted in the status application 161 without dismissing the input display 162 in the deployment application 160. In yet other embodiments, the status display 166 can be incorporated into the deployment application 160 instead of being a part of the status application 161. In further embodiments, the status display 166 and the status application 161 may be omitted, and output fields of the status display 166 may be incorporated into the input display 162, or other suitable elements on the user portal 107.

As shown in FIG. 2B, the relay component 154 can also be configured to selectively relay messages of status updates 118 from the provisioning component 164 to the status display 166 of the status application 161 according to distinct provisioning identifiers associated with the individual status updates 118. For example, during provisioning, the management controller 102 can provide various status updates 118 to the provisioning component 164. Example status updates 118 can include a descriptor (e.g., "provisioning in progress"), a progress percentage (e.g., 0-100%), or other suitable information regarding the provisioning process. In certain embodiments, the management controller 102 can associate the system updates 118 with a distinct provisioning identifier before transmitting the system updates 118 to the provisioning component 164. In other embodiments, the provisioning component 164 can perform such an association before forwarding the system updates 118 to the portal controller 110.

Upon receiving the status updates 118, the relay component 154 can be configured to determine whether the individual system updates 118 are associated with a distinct provisioning identifier that matches one associated with the status display 166. If a match is found, the relay component 154 can forward the system updates 118' to the status application 161, which in turn can output the system updates 118 in the status display 166 on the user portal 107. If a match is not found, or the individual messages of system updates 118 do not include a distinct provisioning identifier, the relay component 154 can block the messages of system updates from reaching the status display 166, raise an alarm, or perform other suitable actions.

As shown in FIG. 2C, upon completion of the provisioning process, the management controller 102 can transmit a completion notification 119 to the provisioning component 164, which in turn forwards the completion notification 119 to the portal controller 110. The relay component 154 can then forwards the completion notification 119' to the status application 161 based on a distinct provisioning identifier associated with the completion notification 119. In certain embodiments, the interface component 152 can also cause the status display 166 to be replaced with other display elements (not shown in FIG. 2C) with suitable links to provide operational or other suitable information regarding the cloud service that is provisioned for, as described in more detail below with reference to FIGS. 3A-3D.

Even though FIGS. 2A-2C illustrate that the portal controller 110 receive the messages of status updates 118 from the provisioning component 164 of the deployment application 160, in other embodiments, the portal controller 110 can also receive the status updates 118 directly from the management controller 110. The status updates 118 can be individually associated with a provisioning identifier according to which the portal controller 110 can selectively forward the messages of status updates 118 to the status display 166. In addition, though only one status application 161 is shown in FIGS. 2B and 2C, in other embodiments, the portal controller 110 can be configured to forward messages of status updates 118 to multiple status applications (not shown) according to the distinct provisioning identifiers associated with the individual status updates 118.

Figure 3A:
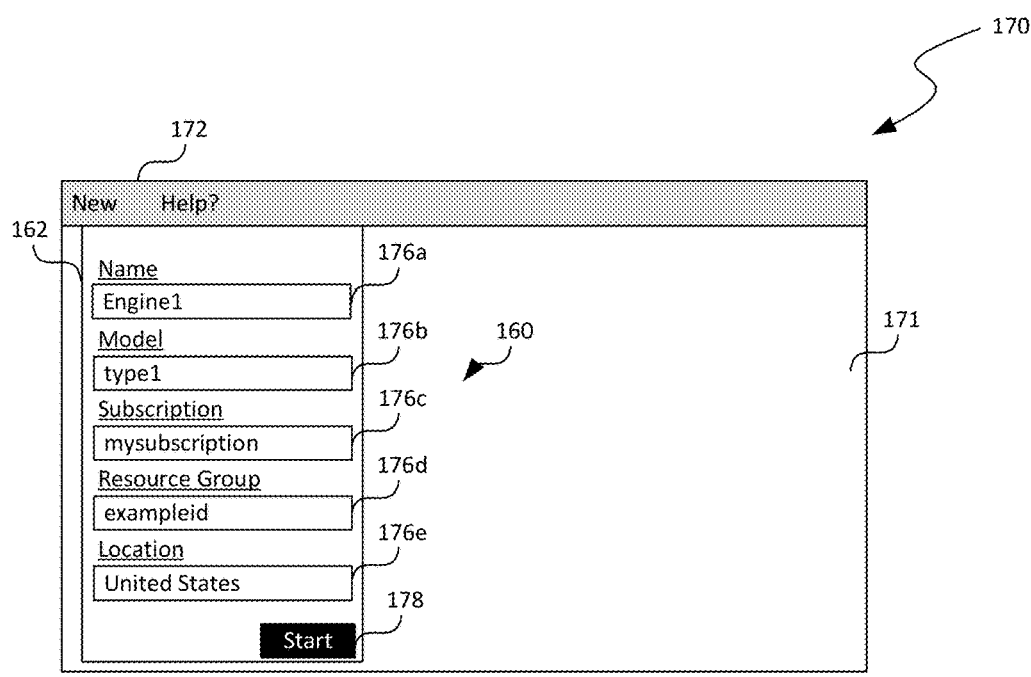
FIGS. 3A-3D are examples of graphical user interfaces illustrating operations of a provisioning process configured in accordance with embodiments of the disclosed technology.

FIGS. 3A-3D are examples of graphical user interfaces 170 suitable for the user portals 107 of FIG. 1A in accordance with embodiments of the disclosed technology. As shown in FIG. 3A, the graphical user interface 170 can include a content area 171 and a menu bar 172 having one or more menu items such as "New," "Help," etc. The graphical user interface 170 can also include one or more frames or other suitable containers to output the input display 162. For example, as shown in FIG. 3A, upon a user 101 actuates the "New" menu item, the graphical user interface 170 can output the input display 162 that includes a plurality of input fields 176a-176e. In the illustrated embodiment, the input display 162 includes input fields 176a-176e for a name, model, subscription, resource group, and location, respectively. In other examples, the input display 162 can also include one or more command buttons, such as "Start" 178 that can be actuated by a user 101 (FIG. 1A).

Figure 3B:
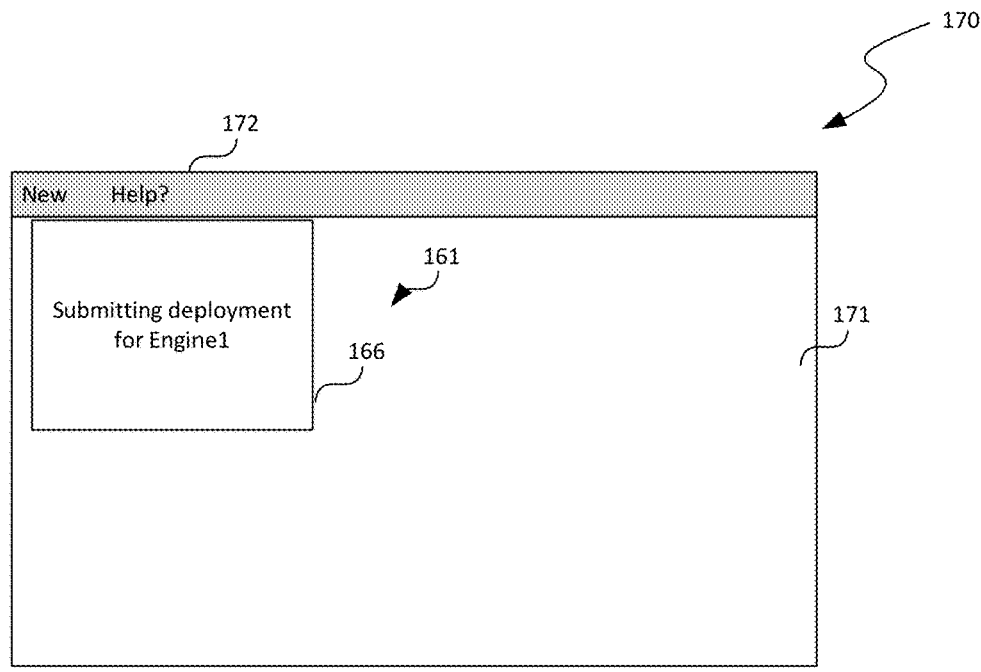
Figure 3C:
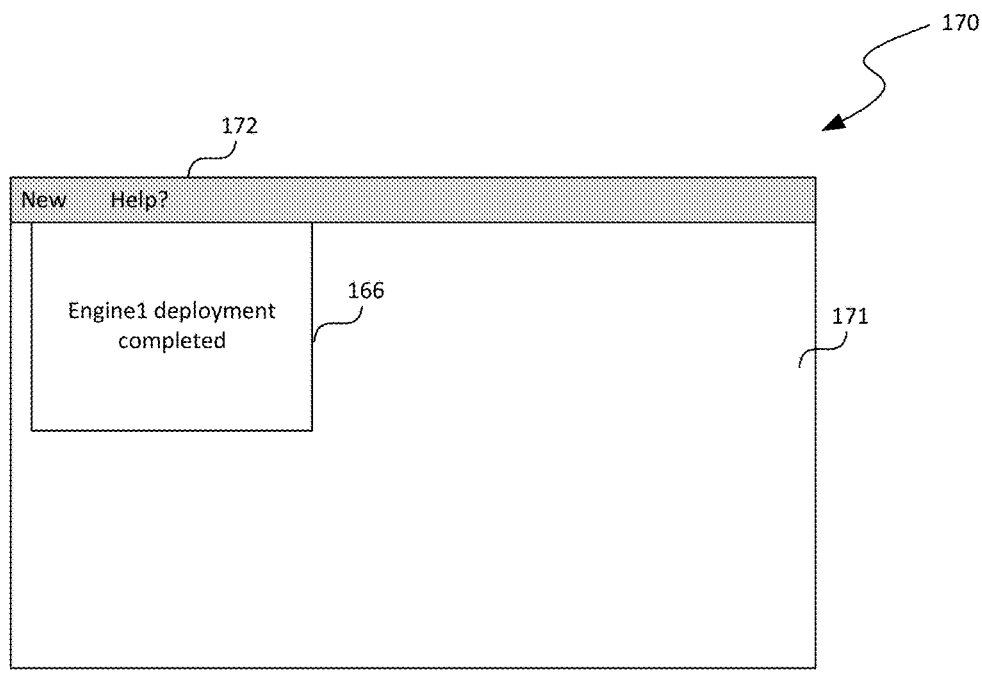

As shown in FIG. 3B, once a user 101 provides user input 114 (FIG. 2A) and actuates the "Start" button 178, the input display 162 can be dismissed from the graphical user interface 170 and replaced with the status display 166 of the status application 161. The status display 166 can be configured to display status updates of the initiated provisioning process, such as, "submitting deployment for Engine1" shown in FIG. 3B. As shown in FIG. 3C, upon completion of the provisioning process, the status display 166 can be updated to shown that "Engine1 deployment completed."

Figure 3D:
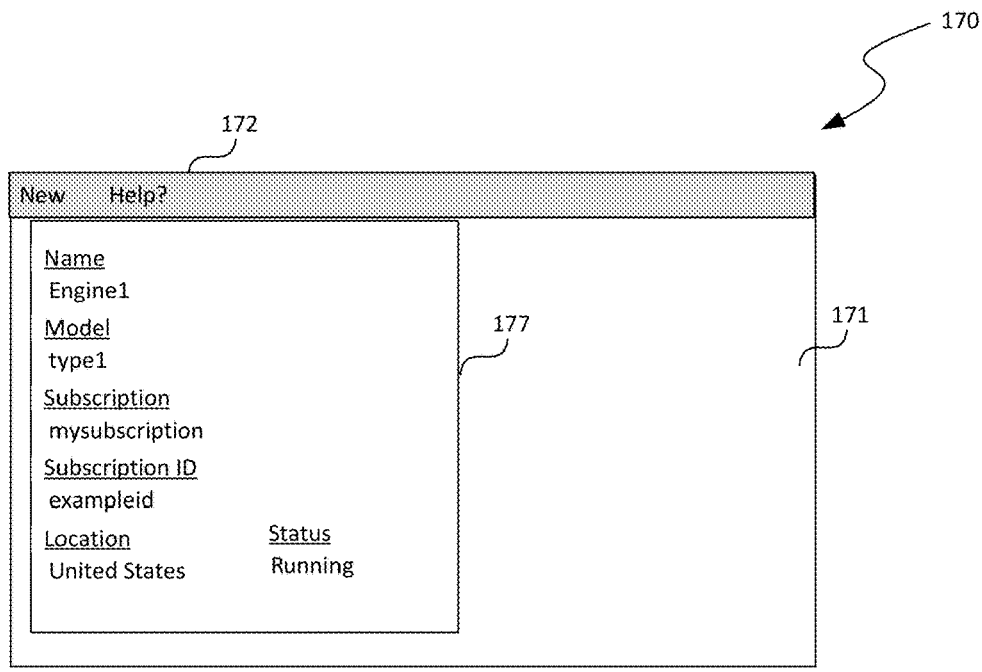

As shown in FIG. 3D, in certain embodiments, the status display 166 can be dismissed from the graphical user interface 170 and replaced with operation panel 177 configured to shown various parameters of the deployed cloud service. For example, the operation panel 177 can show name, model, subscription, subscription ID, location, and a current status of the cloud service in FIG. 3D. In other embodiments, the status display 166 can be maintained on the graphical user interface 170 with an added link to the operation panel 177. In further embodiments, the graphical user interface 170 can include other suitable display elements as configured by the user 101.

Figure 4A:
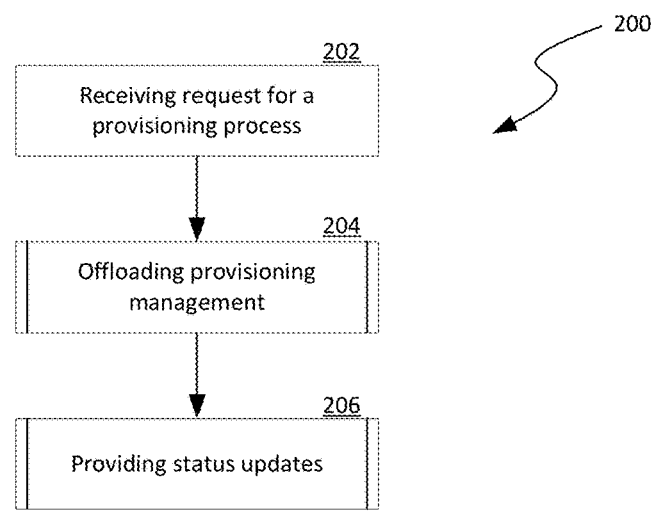
FIGS. 4A-4C are flowcharts illustrating various aspects of processes of provisioning for cloud services in a cloud computing system in accordance with embodiments of the disclosed technology.

FIG. 4A is a flowchart illustrating a process 200 of provisioning for a cloud service in a cloud computing system in accordance with embodiments of the disclosed technology. Even though the process 200 is described in relation to the computing system 100 of FIG. 1A, in other embodiments, the process 200 can also be implemented in other suitable computing systems with similar or different components and/or configurations.

As shown in FIG. 4A, the process 200 includes receiving a request for a provisioning process to deploy a cloud service in a cloud computing system at stage 202. In one example, the received request can be a menu selection in a user portal, as shown in FIG. 3A. In other embodiments, the received request can include an icon selection, a voice command, or other suitable types of user input. The process 200 can then include offloading management of the requested provisioning process to a user-configured deployment application at stage 204. In certain embodiments, the user-configured deployment application can be executed in one or more virtual machines associated with a user. In other embodiments, the user-configured deployment application can be executed in other suitable manners. Example operations of offloading the management of the provisioning process are described in more detail below with reference to FIG. 4B.

The process 200 can also include providing status updates on the user portal at stage 206. In certain embodiments, initiated provisioning processes can each include a distinct provisioning identifier. The user portal can then forward messages of status updates to corresponding output fields on the user portal, as described in more detail below with reference to FIG. 4C. In other embodiments, the user portal can track the various provisioning processes using other suitable techniques.

Figure 4B:
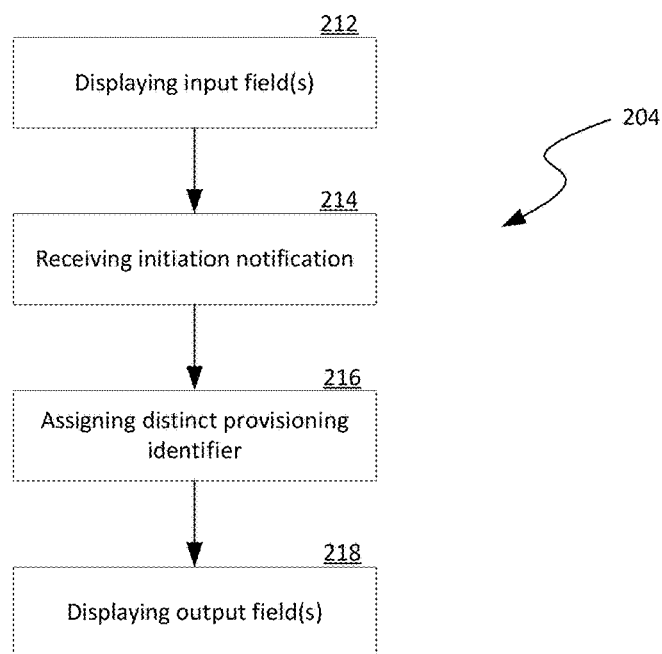

FIG. 4B is a flowchart illustrating operations of offloading management of the provisioning process in accordance with embodiments of the disclosed technology. As shown in FIG. 4B, the operations can include causing one or more input fields to be displayed in the user portal at stage 212. The input fields can be individually configured to receive specification data related to the cloud service. The operations can also include receiving an initiation notification at stage 214. The initiation notification indicates that the requested provisioning process is initiated. In response to the initiation notification, the operations can also include assigning a distinct provisioning identifier to the provisioning process referenced in the initiation notification at stage 216. Optionally, the operations can also include causing one or more output fields to be outputted in the user portal at stage 218. The one or more output fields are individually configured to display a status update of the provisioning process.

Figure 4C:
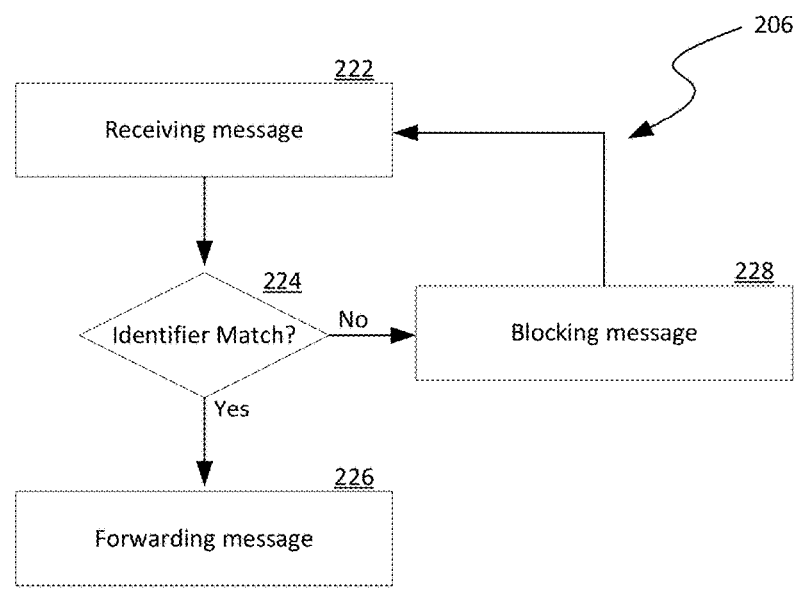

FIG. 4C is a flowchart illustrating operations of providing status updates of the provisioning process in accordance with embodiments of the disclosed technology. As shown in FIG. 4C, the operations can include receiving a message at stage 222, for example, from the deployment application 160 shown in FIG. 2A. The operations can also include a decision stage 224 to determine whether the received message is associated with a provisioning identifier that matches one associated with an output field in the user portal. In certain embodiments, the provisioning identifier can be a part of the message, for example, as preamble, mid-amble, suffix, etc. In other embodiments, the provisioning identifier can be metadata associated with the message.

In response to determining that the received message is associated with a provisioning identifier that matches one associated with the output field in the user portal, the operations include forwarding the message to the output field to be displayed in the user portal. In response to determining that the received message is not associated with a provisioning identifier that matches one associated with the output field in the user portal, the operations include blocking the message from reaching the output field in the user portal at stage 228 before reverting to receiving another message at stage 222.

Figure 5:
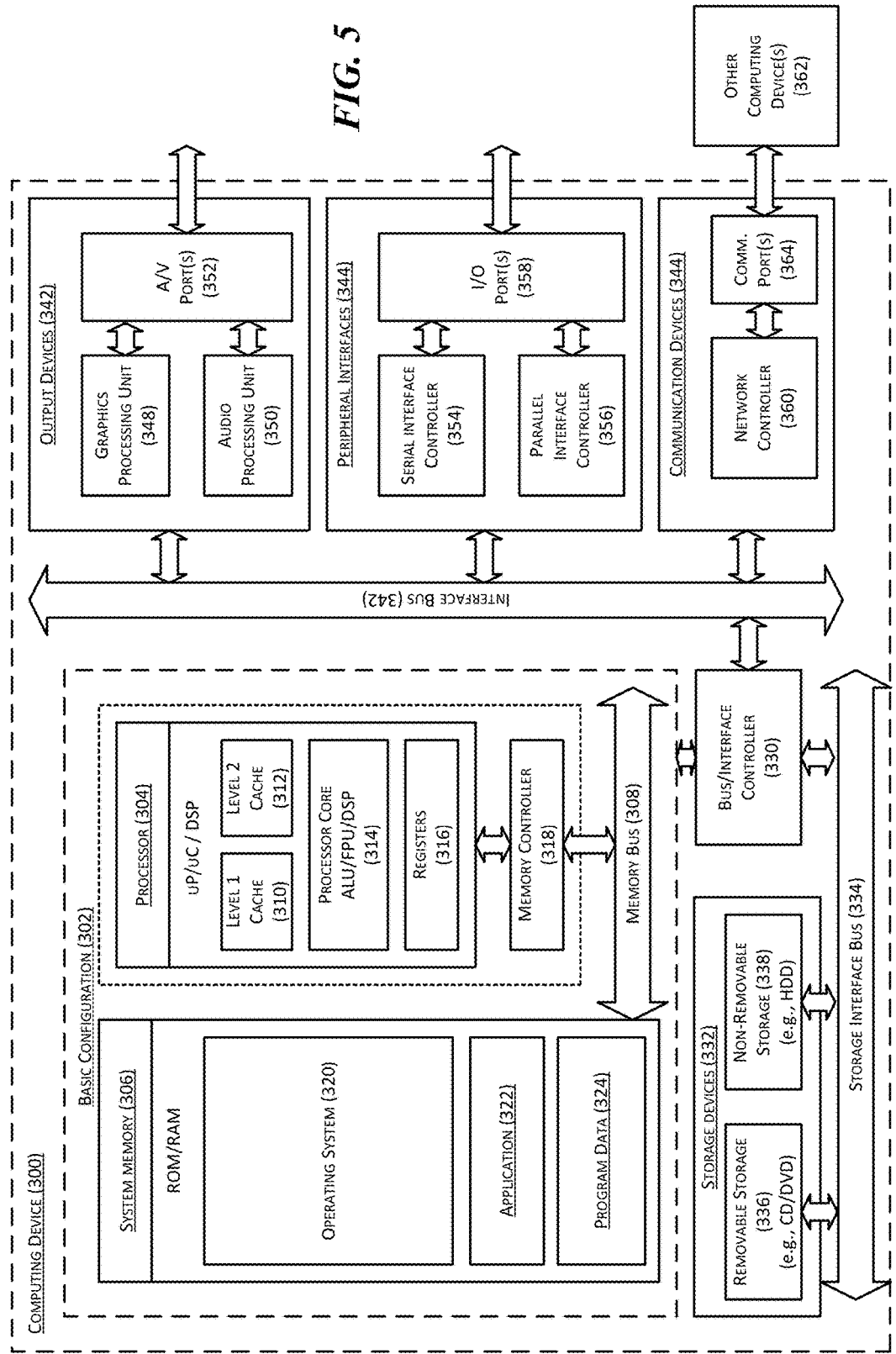
FIG. 5 is a computing device suitable for certain components of the computing system in FIG. 1A.

FIG. 5 is a computing device 300 suitable for certain components of the computing system 100 in FIG. 1A. For example, the computing device 300 can be suitable for the nodes 106 or the portal controller 110 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of provisioning for a cloud service in a cloud computing system, the method comprising:
   receiving, via a user portal, a request to initiate a provisioning process for a cloud service to be hosted in the cloud computing system; and
   in response to the received request, initiating the provisioning process for the cloud service in the cloud computing system and offloading management of the initiated provisioning process from the user portal to a user-configured deployment application, thereby limiting a provisioning workload of the user portal while allowing customization of the provisioning process by the user, wherein offloading management of the provisioning process includes:
      receiving a notification from the deployment application that the provisioning process is initiated; and
      in response to receiving the notification,
      assigning a distinct provisioning identifier to the initiated provisioning process referenced in the received notification; and
      forwarding one or more messages from the deployment application to a status display on the user portal upon identifying that the one or more messages are associated with a provisioning identifier that corresponds with the distinct provisioning identifier assigned to the initiated provisioning process.

2. The method of claim 1 wherein offloading management of the provisioning process also includes causing an input display to be outputted in the user portal in response to the received request, the input display having one or more input fields configured to receive specification data related to the cloud service.

3. The method of claim 2 wherein:
   the user portal includes an HTML webpage; and
   causing the input display to be outputted in the user portal includes causing the input display to be outputted in an iFrame of the HTML webpage.

4. The method of claim 2, further comprising in response to receiving the notification, causing the status display to replace the input display on the user portal.

5. The method of claim 1 wherein forwarding the messages includes:
   receiving the messages from the deployment application;
   for each message,
      determining whether the received message is associated with a provisioning identifier that matches that assigned to the initiated provisioning process; and
      in response to determining that the received message is associated with a provisioning identifier that matches the assigned distinct provisioning identifier, forwarding the received message to the status display.

6. The method of claim 1 wherein forwarding the messages includes:
   receiving the messages from the deployment application;
   for each message,
      determining whether the received message is associated with a provisioning identifier that matches that assigned to the initiated provisioning process; and
      in response to determining that the received message is not associated with a provisioning identifier that matches the assigned distinct provisioning identifier, blocking the received message from reaching the status display.

7. The method of claim 1 wherein:
   the notification is a first notification;
   the initiated provisioning process is a first initiated provisioning process;
   the assigned distinct provisioning identifier is a first provisioning identifier; and
   the method further includes in response to a second notification from the provisioning component that a second provisioning process is initiated, assigning a second provisioning identifier to the second provisioning process, the second provisioning identifier being different than the first provisioning identifier.

8. The method of claim 1 wherein:
   the notification is a first notification;
   the initiated provisioning process is a first initiated provisioning process;
   the assigned distinct provisioning identifier is a first provisioning identifier;
   the status display is a first status display;
   the method further includes, in response to a second notification from the provisioning component that a second provisioning process is initiated, assigning a second provisioning identifier to the second provisioning process and to a second status display, the second provisioning identifier being different than the first provisioning identifier; and
   forwarding the messages includes:
      forwarding a first message associated with the first provisioning identifier to the first status display; and
      forwarding a second message associated with the second provisioning identifier to the second status display.

9. The method of claim 1 wherein:
the notification is a first notification;
the method further includes receiving a second notification indicating that the provisioning process is completed; and
in response to receiving the second notification, causing the status display to be dismissed from the user portal.

10. A computing device, comprising:
a processor; and
a memory containing instructions executable by the processor to cause the processor to perform a process including:
outputting an input display of a user-configured deployment application on a user portal of a cloud computing system, the deployment application including a provisioning component;
responsive to an input to the input display on the user portal, initiating a provisioning process for a cloud service in the cloud computing system with the provisioning component of the deployment application;
receiving, at the user portal, a notification from the provisioning component that the provisioning process is initiated for the cloud service in the cloud computing system;
in response to receiving the notification from the provisioning component, at the user portal,
assigning a distinct provisioning identifier to the initiated provisioning process; and
associating a status display on the user portal with the assigned distinct provisioning identifier to the initiated provisioning process; and
forwarding one or more messages of status updates from the provisioning component to the status display according to the assigned distinct provisioning identifier, thereby limiting a provisioning workload of the user portal while allowing customization of the provisioning process by the user.

11. The computing device of claim 10 wherein causing the status display to be displayed includes causing the status display to replace the input display on the user portal.

12. The computing device of claim 10 wherein:
the user portal includes an HTML document; and
the process performed by the processor further includes allowing the input display and the status display to be outputted in an iFrame of the HTML document.

13. The computing device of claim 10 wherein allowing execution of the user-configured deployment application includes:
outputting the input display on the user portal; and
in response to the notification from the provisioning component, replacing the outputted input display with the status display on the user portal.

14. The computing device of claim 10 wherein forwarding the message of status updates includes:
receiving the messages from the provisioning component;
determining whether the received messages are individually associated with a distinct provisioning identifier that matches that assigned to the initiated provisioning process; and
in response to determining that the received messages are individually associated with a distinct provisioning identifier that matches that assigned to the initiated provisioning process, forwarding the received message to the status display.

15. The computing device of claim 10 wherein forwarding the message of status updates includes:
receiving the messages from the provisioning component;
determining whether the received messages are individually associated with a distinct provisioning identifier that matches that assigned to the initiated provisioning process; and
in response to determining that the received messages are not associated with a distinct provisioning identifier that matches that assigned to the initiated provisioning process, blocking the received messages from reaching the status display.

16. The computing device of claim 10 wherein:
the notification is a first notification;
the initiated provisioning process is a first initiated provisioning process;
the assigned distinct provisioning identifier is a first provisioning identifier; and
the process performed by the processor further includes in response to a second notification from the provisioning component that a second provisioning process is initiated, assigning a second provisioning identifier to the initiated second provisioning process, the second provisioning identifier being different than the first provisioning identifier.

17. The computing device of claim 10 wherein:
the notification is a first notification;
the initiated provisioning process is a first initiated provisioning process;
the assigned distinct provisioning identifier is a first provisioning identifier;
the status display is a first status display;
the method further includes, in response to a second notification from the provisioning component that a second provisioning process is initiated, assigning a second provisioning identifier to the second provisioning process and to a second status display, the second provisioning identifier being different than the first provisioning identifier; and
forwarding the message includes:
forwarding a first message associated with the first provisioning identifier to the first status display; and
forwarding a second message associated with the second provisioning identifier to the second status display.

18. The computing device of claim 10 wherein:
the notification is a first notification;
the process performed by the processor further includes receiving a second notification from the provisioning component indicating that the provisioning process is completed; and
in response to receiving the second notification, removing the status display from the user portal.

19. A method of provisioning for a cloud service in a cloud computing system, the method comprising:
providing a user portal configured to communicate with a deployment application configured by a user for provisioning cloud services in the cloud computing system;
initiating, with the deployment application, a provisioning process for a cloud service in the cloud computing system;
receiving, at the user portal, a notification from the user-configured deployment application that the provisioning process is initiated for the cloud service in the cloud computing system; and
in response to receiving the notification, at the user portal, assigning a distinct provisioning identifier to the initiated provisioning process associated with the notification;

causing an output field to be displayed on the user portal, the output field being associated with the distinct provisioning identifier assigned to the initiated provisioning process; and subsequently, forwarding one or more messages from the deployment application to the output field upon identifying at least one of the messages is being associated with a provisioning identifier that corresponds with the distinct provisioning identifier assigned to the initiated provisioning process, thereby limiting a provisioning workload of the user portal while allowing customization of the provisioning process by the user.

20. The method of claim 19 wherein forwarding messages includes:

determining whether the messages are associated with a distinct provisioning identifier that matches the distinct provisioning identifier assigned to the initiated provisioning process; and in response to determining that the messages are associated with a distinct provisioning identifier that matches the distinct provisioning identifier assigned to the initiated provisioning process, forwarding the messages to the output field.

\* \* \* \* \*